United States Patent [19]

Malyniak et al.

[11] Patent Number: 4,931,297

[45] Date of Patent: Jun. 5, 1990

[54] FOOD PRESERVATION PROCESS UTILIZING A BLEND OF ACIDULANTS

[75] Inventors: Nancy R. Malyniak, Cambridge; James F. Meagher, Peterborough, both of Canada

[73] Assignee: Robin Hood Multifoods, Inc., Rexdale, Canada

[21] Appl. No.: 336,214

[22] Filed: Apr. 11, 1989

Related U.S. Application Data

[63] Continuation of Ser. No. 13,468, Feb. 11, 1987, abandoned.

[51] Int. Cl.[5] ............................ A23B 7/10; A23B 4/12
[52] U.S. Cl. .................................... 426/265; 426/268; 426/650
[58] Field of Search ............... 426/254, 262, 265, 268, 426/320, 326, 531, 532, 538, 650, 654

[56] References Cited

U.S. PATENT DOCUMENTS

| | | | |
|---|---|---|---|
| 3,416,930 | 12/1968 | Irani | 426/650 |
| 4,011,346 | 3/1977 | Ernst | 426/532 |
| 4,305,966 | 12/1981 | Ueno et al. | 426/652 |
| 4,444,796 | 4/1984 | Ueno et al. | 426/532 |
| 4,497,845 | 2/1985 | Percel et al. | 426/646 |
| 4,511,592 | 4/1985 | Percel et al. | 426/646 |
| 4,741,911 | 5/1988 | McIntyre et al. | 426/106 |
| 4,789,553 | 12/1988 | McIntyre et al. | 426/268 |

FOREIGN PATENT DOCUMENTS

| | | |
|---|---|---|
| 0190028 | 8/1986 | European Pat. Off. . |
| 0191573 | 8/1986 | European Pat. Off. . |
| 0192354 | 8/1986 | European Pat. Off. . |

*Primary Examiner*—Carolyn Paden
*Attorney, Agent, or Firm*—St. Onge Steward Johnston & Reens

[57] ABSTRACT

This invention relates to a method for sterilization and preservation of food utilizing a blend of food acidulants. Adding blends of glucono-delta-lactone and adipic acid, with or without malic acid and/or citric acid will lower the pH of the food without the expected consequence of proportionately increasing the acidic flavor of the food product. This permits processing the food under milder conditions (heating or otherwise) resulting in a better quality food product more acceptable to consumers. The acidulant blends of the present invention also have application in the preparation of non-food consumer products.

6 Claims, No Drawings

FOOD PRESERVATION PROCESS UTILIZING A BLEND OF ACIDULANTS

This is a continuation of co-pending Ser. No. 07/013,468 filed on Feb. 11, 1987 now abandoned.

FIELD OF INVENTION

This invention relates to a method for sterilization and preservation of food utilizing a blend of acidulants. In particular, this invention relates to the use in food products, of specific blends of food acidulants to lower the pH of the food without the expected consequence of proportionately increasing the acidic taste of the food product. Lowering the pH of a food permits preservation and sterilization of the food under milder conditions resulting in a better quality and more acceptable food product. The present invention is applicable to many foods under a variety of food processing conditions. The invention also has potential application to non-food products.

DESCRIPTION OF PRIOR ART

The use of acidulants in food processing is well known. In food technology, acidulants are commonly used as flavouring agents, buffers, preservatives, antioxidants, viscosity modifiers, melting modifiers and meat curing agents. Acids are also known to be naturally present in food. A common example is citric acid naturally present in fresh fruits such as lemons and limes. These fruits owe their tangy taste to the presence of citrate ions. Acetic acid (a major component of vinegars) has an extensive history and use, occurring naturally in food fermentation. The acid content of different foods varies. Foods such as asparagus, peas, meat, corn and fish are considered to be low acid foods. Other foods such as cherries, plums and sauerkraut are high acid foods. The most commonly used acidulants in food processing are the following acids; acetic, propionic, sorbic, succinic, fumaric, lactic, malic, tartaric, citric, phosphoric, adipic, glucono-delta-lactone, tannic and ascorbic. Of these acids all but phosphoric acid are organic acids. Acidulants affect the taste or flavour of food. All acidulants are usually described as having a "tart" or "sour" taste, however, a slightly different tartness or sourness can be ascribed to each individual acidulant. Taste is a subjective human perception which is not fully understood. Flavour is the net effect of several physiological reactions including taste, odor, reaction to temperature, mouth-feel and sensations derived from chewing and swallowing. Consequently, flavour is very important when assessing consumer acceptability of food. The best guide in evaluating flavour is the reaction of human taste buds.

The sensation of sourness is evoked solely by the hydrogen ion. The limit of sensitivity is about 0.001N. For any given acid, increasing the concentration increases the sourness, but different acids do not agree in their strength/sourness relationship. In particular, weak acids taste much sourer than strong acids, at the same pH. The sensation is caused not by the mere presence of hydrogen ions but by the process of neutralizing them; in other words, sourness is a function not of pH but of titratable acidity. Titratable acidity of food acidulants is a quantitative determination of the potential acidity of the acidulant-i.e.-the quantity of hydrogen ions which can be made to combine with a base. A strong acid is completely dissociated in a dilute solution but a weak acid exists in solution largely in the form of undissociated molecules. As soon as neutralization starts, the equilibrium is upset and more molecules of acid dissociate to maintain the hydrogen ion concentration, which has to be neutralized continually until no more acid molecules remain. Therefore, weak acids taste more sour than strong ones at the same pH because their concentration is higher.

The particular food acidulant selected for use in association with a specific food product has traditionally been guided by the specific acidulant's inherent taste imparting properties. At equal concentrations, acidulants vary in their ability to depress pH and in the degree of acidic taste or intensity of tartness produced. One acidulant cannot be substituted for another on an equal weight or concentration basis. Also, the tartness detectable by a human being will vary for different food products containing the same acidulant because of differences in overall flavour. Occasionally, a combination of food acidulants will synergize one another and produce a higher degree of tartness than anticipated. Blends of acidulants (frequently found in nature) may result in a superior flavour which an acidulant alone could not achieve. Sour tasting acidified products are often balanced in flavour with the addition of excessive sugar and to a lesser degree, salt.

Acidulants are widely used as an aid in the sterilization and preservation of food, helping to maintain the normal flavour, colour and texture. Food products whether natural or prepared, are susceptible to microbial growth and consequent spoilage. Sterilization and preservation of food is most commonly achieved by;

(a) heating a hermetically sealed food to a predetermined temperature for specific a period of time (known as "retorting"), and/or (b) decreasing the pH of the food, permitting shortening of the sterilization time and decreasing the sterilization temperature (milder retorting conditions).

Bacteria and other types of microorganisms are more readily killed in acid media. By the addition of acid to a food product, the pH can be reduced to 4.6 or lower, thereby eliminating the possibility of food poisoning as a result of toxins and in particular the toxin produced by *Clostridium botulinum* (botulism). Adding an acidulant to adjust downward the pH of a food product also permits the shortening of sterilization time and the lowering of sterilization temperatures. This is important since prolonged heating of many foods such as fruits, vegetables, and their juices not only destroys their natural structure (thereby affecting taste) but also reduces their nutritive value. Significantly reducing, by acidification, the thermal processing (retorting) conditions required for low acid foods can result in improved texture, flavour, colour and nutritional value. Acidulant preservation is generally bacteriostatic rather than bactericidal. The inhibitory effect of acidulants is due to the degree of undissociated acid molecules present, which in turn depends on the equilibrium pH of the product. Depending on the particular acid, and considering for example acetic acid, the lower the pH, the lower the degree of dissociation and the greater the proportion of the acetic acid present that can exercise an inhibitory effect. Generally, the weaker the acid, the lower the dissociation constant and therefore the better the preservation qualities of that acid. Also organic acids prevent microbial spore germination at a much higher pH than do inorganic acids. This would indicate that the undissociated acid as well as the anions may be important in the killing of microorganisms at elevated temperatures.

Pasteurization is typically defined as the heat treatment of food (usually below 100° C.) intended to destroy all organisms dangerous to health, or heat treatment which destroys part but not all microorganisms that cause food spoilage or interfere with desirable fermentation.

Common examples of food preservation are pickling, in which the food is subjected to an acid solution (typically containing vinegar) and canning. Simple refrigeration of food will also aid preservation for a limited time. Individually or in combination, acidity (pH) and retorting (temperature/time exposure) play a critical role in food preservation. The relationship of these two factors to sterilization and food preservation is directly proportional. The lower the pH of the food product, the less heat/time application is required and the higher the pH the more heat/time application is necessary. The shelf-life (whether refrigerated or non-refrigerated) of any food will increase as the pH of the food is decreased.

Typically food preservation is dependant on the following three conditions: (a) application of heat to the food product for a time and at a temperature sufficient to ensure consumer safety and commercial sterilization of the product; (b) utilization of a container closure which prevents re-entry of microorganisms into the sterilized product; and (c) proper post-heating handling procedures which protect the integrity of the sealed container and processed food. Suitable containers include hermetically sealable cans, glass jars and pouches. Heating, however, diminishes the nutritional value of many foods and often results in a less acceptable texture and taste of the product. Consequently, the use of food acidulants which reduces the requisite exposure to heat of the food product is advantageous. Decreasing the pH (by the addition of acidulants) of food products not sterilized and/or hermetically sealed will still to a certain degree preserve the food through the inhibition of microbial growth.

As already briefly mentioned, the problematic fault of food acidulants is that they typically possess a "tart" flavour and tend to have varying aftertaste effects. Due to these objectionable flavour characteristics, acidulants have generally not been incorporated in foods where any change in the original food product flavour profile would occur. This has forced food processors to rely more extreme retorting conditions for delicately flavoured low acid foods. Also, care has been required when adding acidulants to typically high-acid type foods, as the degree of acid added proportionately affects the intensity of the tartness produced.

As a result of the aforesaid factors, many foods cannot be appealingly preserved at all and other foods are preserved with the use of acidulants, however by sacrificing the normal flavour profile of the food product.

Since heating destroys nutritional value of food and diminishes its palatability (taste, texture etc.) the prior art has been concerned with lowering the pH of the food in order to achieve sterility under milder retorting conditions and facilitate preservation. Reducing the pH has focused the problem on the resulting tart or sour taste of such foods. In response, antisouring agents such as artifical or natural sweeteners have been incorporated into food products to make their taste more palatable (see, for example, Canadian Patent No. 1,131,982, issued Sept. 21, 1982 Yamaguchi). Heretofore, acidulants have more commonly been used singularly in food sterilization and preservation. However, acidulants have been used in combinations in order to reach a desired tartness level and an otherwise unavailable titratable acidity level. It is also known that some combinations of acids such as the mixture of lactic acid and acetic acid can result in a somewhat diminished acidic taste. No one, however, has been able to circumvent in any substantial manner the apparent inherent tartness or sourness in food products resulting from the use of acidulants (whether alone or in combination) in the sterilization and preservation thereof. Furthermore, the increased tartness or sourness associated with the use of acidulants in food preservation has never been avoided (except by masking such taste). As a result, food products, which exhibit a dramatic change in their flavour profile upon the addition of food acidulants have been unacceptable to consumers and attempts at preserving such foods have heretofore been unsuccessful.

SUMMARY OF THE INVENTION

It is an object of the present invention to provide a method of acidifying foods which permits shortened sterilization times/temperatures (milder retorting conditions and consequently improves the overall quality of the final food product.

It is a further object of the present invention to provide a method of acidifying foods without significantly imparting to the food an objectionable tart or sour flavour.

It is a still further object of the present invention to provide a method of acidifying shelf stable hermetically sealed low acid foods to a pH of 4.6, permitting favourable processing conditions without imparting any significant additional acid taste.

It is a still further object of the present invention to provide a method of acidifying shelf stable hermetically sealed low acid foods to within the range pH 4.3–4.6 permitting favourable processing conditions, thereby increasing the shelf-stability of the foods without adding any significant acid flavour.

It is a still object of the present invention to provide a method of acidifying shelf stable hermetically sealed low acid foods to a pH below 4.3 thereby allowing the retorting of the foods under very mild conditions with minimal resultant additional acid flavour.

It is a still further object of the present invention to provide a method of acidifying high acid foods resulting in an improved overall flavor.

It is a still further object of the present invention to provide a method of acidifying (typically refrigerated) non-acid foods to a pH below 4.6 with little or no resulting alteration of the original food product flavour profile.

It is a still further object of the present invention to provide a method of acidifying to a greater extent or completely, foods typically partially acidified, with little or no alteration of the original food product flavour profile. It is a still further object of the present invention to provide a method of acidifying dry mix food products permitting the eventual production of high acid foods on reconstitution without imparting any significant additional acid taste.

These and other objects of this invention have been accomplished by the processes hereinafter summarized and described in detail.

The present invention provides a process for the preservation of food comprising reducing the pH of the food to within the range pH 2.5-pH 6.9 by adding thereto a blend of acidulants comprising glucono-delta-lactone and adipic acid, with or without malic acid and/or citric acid. The process may further comprise the step of subjecting the food to retorting conditions sufficient to eliminate undesired microbial growth said retorting conditions being milder than otherwise necessary had the pH of the food not been so reduced. Preferred blends of acidulants may comprise from 70% up to but not including 100% glucono-delta-lactone and adipic acid up to 30%, with or without citric acid up to 10% and/or malic acid up to 10%. Most preferred blends of acidulants are: glucono-delta-lactone 80%, adipic acid 10% and citric acid 10%; glucono-delta-lactone 80%, adipic acid 10% and malic acid 10%; glucono-delta-lactone 80%, adipic acid 10%, citric acid 5% and malic acid 5%; and glucono-delta-lactone 90% and adipic acid 10%. In addition to food preservation, the aforesaid acidulant blends may be used in known processes for heat sterilization of food. The invention further contemplates food prepared by any of the aforesaid processes or incorporating any of the aforesaid acidulant blends. Acidulant blends of the present invention may also be used to acidify non-food consumer products.

DESCRIPTION OF INVENTION

FIG. 1 is a sample score sheet used by the taste panel as part of the organoleptic analysis of food acidulant blends and/or food products.

According to the present invention, food or food products (these terms are herein considered to be synonymous and interchangeable with one another) can be acidified by the addition of specific blends of acidulants. The term "acidulant blend" as used herein merely means a combination or mixture of at least two food acidulants. The actual method of adding the acidulants to the food can be by way of any one of a number of known methods. Working the present invention requires preparation of a suitable acidulant blend and thereafter acidification of the food product utilizing the blend.

(a) Preparation of an Acidulant Blend

The acidulant blends of the instant invention can be made in a variety of ways using known chemical principles and equations. The percentage of each acid in the acidulant blends referred to herein is a percentage by titratable acidity of the acid based on a predetermined acidity level as acetic and calculation factors concerning the actual type of acids used, i.e. - Adipic and malic acids are diacids (dicarboxylic); citric acid is a triacid (tricarboxylic); and glucono-delta-lactone (also abbreviated "GDL") is a monoacid (monocarboxylic).

The gram molecular weights of these acids (gmw) are:

| Adipic | 146.14 |
| GDL | 178.14 |
| Citric | 192.12 |
| Malic | 134.09 |

The calculations utilized for the preparation of a particular acid blend will depend on the requisite titratable acidity and mass of the particular sample. It is recommended that standardized acidulant blend solutions be prepared to facilitate application to specific food product formulations (b) Acidification of a Product The easiest and quickest way to determine what quantity of a standard acidulant lend is required for each product formulation is as follows:
(i) use an acidulant blend solution of known exact titratable acidity. i.e. 1.001%, etc.
(ii) prepare the food product to be acidified as per the specified formula.

| i.e. - carrots - | 54.0% | blanched carrots |
| | 0.8% | sugar |
| | 0.69% | salt |
| | 44.6% | water |
| | 100.0% | |

(iii) add this formula together. Since foods which are whole (solid) take time to equilibrate and to achieve taste uniformity, and in order to quickly determine the exact amount of acid to add, the above formula may be blended via a blender.
(iv) weigh (to the nearest 10th of a gram) a known quantity (i.e.—100.0 grams) of the blended food product and add to small beaker.
(v) using a standardized pH meter, titrate into the blended food product the acidulant blend solution using a buret (with scaling to 10th of a ml). While adding the acidulant blend, the blended food is constantly stirred via stirring rod and stirrer.
(vi) observe the pH meter until the desired pH level is reached.
(vii) record the exact quantity of acidulant blend solution added to obtain the target pH (e.g. —23.1 ml solution to reach pH 3.65).
(viii) determine the total titratable acidity of the blended food (i.e.— known weight of this new blend back titrated against a standardized solution of NaOH i..— might obtain—0.20% titratable acidity as acetic)
(ix) some adjustment of the salt and sugar levels may be needed here (done by tasting and calculating needed quantities)
(x) to make the actual food product (i.e.— acidified carrots), include the predetermined quantity of acidulant blend solution in the formula and readjust to 100%. Add the carrots to a jar and thereafter add the liquid portion of the formula to the jar. If need to top off jar, add more water as this will not alter the formula to any significant amount.
(xi) retort process the product:
cap, heat to internal temperature required, for required period, (i.e.— for example 175° F. for 15 minutes),
cool and hold at room temperature for 10 days and then
evaluate (needs time to equilibrate completely). This method is operable for almost any food product as long as precision is used. Slight variations might occur when the actual product is made but these are usually minimal. Using this method eliminates any trial and error method of working. Also, if different blends for different flavour properties are required, they can very simply and quickly he made and incorporated.

If necessary, sugar and/or salt levels may be adjusted. Sugar and salt cover-up tartness or at least make it more tolerable. Pickled products (typically of a high vinegar level i.e.— sweet pickles) are typically very high in salt and sugar because the vinegar (tart) note is very strong. When this same "sweet pickle" is made with an acidulant blend according to the present invention, the level of detectable tartness is very minimal compared to the vinegar-made product. Consequently, less sugar and salt are required to balance the acid flavour. On average as the pH is dropped, more acid notes are perceived and therefore more sugar and salt are required. This is a general rule for any type of acidification, however the acidulant blends of the present invention require significantly less sugar/salt because they impart a significantly reduced acidic taste.

The method of comparing flavour characteristics of acidulant blends incorporated into food products is subjective, being human perception. Organoleptic analysis of food products is performed by taste panels of individuals who class the subject acidified food product with the aid of the score sheet FIG. 1. Organoleptic analysis referred to hereinafter was performed with the aid of the FIG. 1 score sheet.

As part of a preliminary investigation leading to the present invention eight food acidulants, namely acetic, adipic, lactic, citric, glucono-delta-lactone, malic, phosphoric and tartaric acids were combined in randomized fashion using a fractional factorial experimental design. All acidulants were studied at the same titratable acidity of 0.20±0.01% as acetic acid. The final scores were then averaged to arrive at an acidulant blend raw score. The raw scores were then tabulated and reviewed using the Yates technique. The maximum raw score was 135.0. The score for water would be 0.0. The scores for the individual acids were as follows:

| Acetic | 60.0 |
| --- | --- |
| Adipic | 53.0 |
| Lactic | 57.0 |
| Citric | 58.0 |
| Glucono-delta-lactone | 59.0 |
| Malic | 42.0 |
| Phosphoric | 42.0 |
| Tartaric | 65.0 |

The results of the preliminary factorial experimental design statistically considered adipic acid to reduce the acid taste perception to the greatest degree. The results also suggested glucono-delta-lactone, citric and malic acids should also be further investigated.

In subsequent tests using the same group of expert panelists and varying the ratios of the four selected acidulants, in combinations of some or all four acids, the acidulant blend receiving the lowest flavour score (the lower the score, the more similar the properties are to water) namely 6.5, was attributed to glucono-delta-lactone/adipic/citric acids in a ratio of 80:10:10 of titratable acidity as acetic. Next lowest scores were attributable to the following combinations:

gulcono-delta-lactone 90%/adipic acid 10%
glucono-delta-lactone 80%/adipic acid 10%/malic acid 10%
glucono-delta-lactone 80%/adipic acid 10%/citric acid 5%/malic acid 5%

Although the invention contemplates the use of blends of acidulants comprising glucono-delta-lactone and adipic acid (in all concentrations) with or without malic and/or citric acid, preferred blends of acidulants comprise from 70% up to but not including 100% glucono-delta-lactone and adipic acid up to 30%, with or without citric acid up to 10% and/or malic acid up to 10%.

The primary application of the present invention is in hermetically sealed wet systems such as thermally processed applications for shelf stable and refrigerated food products.

However, the present invention can also be used under a variety of food processing conditions and is not limited to application in conjunction with retorting or to hermetically sealed products. For example the present invention can be utilized in the preparation of food products which are neither heated nor refrigerated. Other possibilities include chemical sterilization and/or irradiation of food acidified with a blend of acidulants. The present invention can also be incorporated into dry mix food products permitting the eventual production of high acid foods on reconstitution without imparting any additional acid taste.

The present invention also has potential non-food applications. Acidic products, whether food or consumer products (household cleaners etc.) have a characteristic "sour" odour. Acidifying consumer products, such as kettle cleaning agents, with a blend of acidulants according to the present invention will circumvent much of the sour odour present in these products.

The application of the present invention to reduce the pH of shelf stable hermetically sealed low acid foods to pH 4.6 provides for improved food product texture, colour (with exception to chlorophyllic colours), nutrition retention, overall flavour, overall appearance and allows the use of milder retorting conditions thereby reducing processing costs.

The application of the present invention to reduce the pH of shelf stable hermetically sealed low acid foods to a pH below 4.6, but equal to or above pH 4.3, increases the shelf-stability of these foods without the addition of any significant acid flavour. Utilizing the present invention under these conditions significantly improves colour, flavour, texture, nutrition retention, overall appearance and reduces processing costs. It furthermore permits the use of retorting conditions below 100° C. yet providing increased shelf-stability upon opening the food product under refrigerated or non-refrigerated conditions.

The application of the present invention to reduce the pH of shelf stable hermetically sealed low acid foods to a pH below pH 4.3 allows the processing of the food under very mild retorting conditions. Adding, the acidulant blends of the present invention in relatively large quantities will significantly reduce the product pH with only a slight increase in detectable acidic flavour. Processing (retorting) conditions are minimal and the food product will have a significantly increased shelf-stability upon opening under refrigeration or otherwise. In these circumstances the resulting food product will have more typically natural flavour and texture qualities. The food product will also have improved colour and overall appearance.

Applying the present invention to hermetically sealed high acid foods will alter and improve the overall flavour of the products. Typically "pickled" flavoured products can be produced with little acidic taste and character. Totally new flavoured food products can be produced (i.e. carrots). Under these circumstances the sugar/salt level requirements can be manipulated. It will no longer be necessary to balance the sugar/salt levels with the previously present high acid tartness.

The present invention permits the use of significantly less sugar/salt than heretofore possible. It will also allow for the reduction or elimination of chemical preservatives (other than acids) thereby producing a more natural flavoured product, or naturally preceived product.

Applying the present invention to typically refrigerated non-acid foods will allow the production of refrigerated foods with a pH below pH 4.6 with no or little alteration of the original flavour profile. Inherent advantages are extended product shelf-life and the reduction or elimination of chemical preservatives other than food acidulants.

Applying the present invention to foods typically partially acidified and refrigerated allows for the complete or increased acidification of these products with no or little alteration of the original flavour profile. Advantages include provision for extended product shelf-life and the reduction or elimination of chemical preservatives. It may also allow for non-refrigerated storage of some such products.

Applying the present invention to dry mix products will allow for the eventual production of high acid foods on reconstitution without imparting any additional acid taste. The benefits include extended product shelf-life upon reconstitution.

The acidulant blends of the present invention can also be used advantageously in preserving foods which are not hermetically sealed and/or are not refrigerated. Such foods will obviously not remain free from spoilage nearly as long as foods hermetically sealed during sterilization and/or refrigerated (all other things being equal. However, using the acidulant blends herein disclosed will preserve such foods longer under these as well as other, otherwise unfavourable conditions, yet maintaining an acceptable flavour profile.

The process of the present invention and its inherent advantages can best be noted from the following examples.

EXAMPLE 1(a)

Non-acidified carrots

Carrot slices were blanched for 3 minutes in 175° F. water and drained. The carrots were then packed in a 250 ml jar in a pack ratio of approximately 54/46, carrots to liquid. The packed product contained 54% blanched carrots, 0.8% sugar, 0.6% salt and 44.6% water. This food product was processed in the 250 ml. jar by still retort to an internal temperature of 240° F. for 35 minutes. The equilibrated pH of the final product was 6.04. The equilibrated titratable acidity (as acetic) of the final product was negligible. Organoleptic analysis disclosed the product to have a rather bland, "cooked" flavour. The texture of the carrots was extremely soft and mushy. Furthermore, the carrots had poor sliced integrity.

Example 1(b)

Acidulant blend carrots

Carrot slices were blanched for 3 minutes in 175° F. water and drained. The carrots were then packed in a 250 ml jar in a pack ratio of approximately 54/46 (carrots/liquid). The product composition was 54% blanched carrots, 0.9% sugar, 0.68% salt 13.56% acidulant blend (1.07% as acetic) and 30.86% water. The acidulant blend was a mixture of glucono-delta-lactone/adipic/citric in the ratio of 80/10/10. This food product was processed in a still retort to an internal temperature 195° F. for 15 minutes (internal temperature of 195° F. held for 15 minutes). The final product had an equlibrated product pH of 4.3. The final product had an equilibrated titratable acidity (as acetic) of 0.135%. Organoleptic analysis disclosed virtually no acid flavour and very natural carrot notes. The carrot texture was good, it was semi-firm and slice integrity had been maintained. Furthermore, the texture was much better than the final product from Example 1(a).

EXAMPLE 1(c)

Acidulant blend carrots

Carrot slices were blanched for 3 minutes in 175° F. water and drained. The carrots were packed in a 250 ml jar in a pack ratio of approximately 54/46 (carrots/liquid). Product composition was 54% blanched carrots, 18.7% acidulant blend (1.07% titratable acidity as acetic), 1.0% sugar, 0.75% salt and 25.55% water. The acidulant blend was comprised of glucono-delta-lactone/adipic/citric acids in the ratio of 80/10/10. The food product was processed in the 250 ml jar at 175° F. for 15 minutes (through pasteurizer). The final product had an equilibrated pH of 3.78. The final product had an equilibrated titratable acidity (as acetic) of 0.19%. Organoleptic analysis disclosed an extremely faint lingering acidic note. The flavour was mild and the product had very detectable typical carrot notes. The texture of the product was good, the carrots being very firm, crisp and very natural. There were no objectionable cooked notes.

EXAMPLE 1(d)

Vinegar pack carrots

Carrot slices were blanched for 3 minutes in 175° F. water and drained. The carrots were packed in a 250 ml jar in a pack ratio of approximately 54/46 (carrots/liquid). Product composition was 54% blanched carrots, 18.0% vinegar (4.1% titratable acidity as acetic acid), 1.3% sugar, 1.0% salt and 25.7% water. The product was processed while in the jar, for 15 minutes at a product internal temperature of 175° F. (through pasteurizer). The equilibrated final product pH was 3.77 and titratable acidity (as acetic) was 0.86%. Organoleptic analysis disclosed a tart, vinegary flavour. The flavour was harsh and it was not possible to distinguish the typical carrot flavour within the product. The product texture was good. The carrots were firm and crisp and very natural. There were no objectionable cooked notes.

EXAMPLE 2(a)

Non-acidified pasta

Macaroni was pre-cooked for 4 minutes. The macaroni was then packed into a 250 ml glass jar in a pack ratio of approximately 40/60 (macaroni/liquid). The food product constituted 42.1% cooked macaroni elbows, 0.2% salt and 57.7% water. The food product was processed in the jar by still retort to an internal temperature of 240° F. and held there for 45 minutes. Equilibrated final product pH was 6.10 and titratable acidity was negligible. Organoleptic analysis disclosed a bland cooked flavour. The texture of the product was extremely soft and mushy. There was no macaroni elbow integrity.

EXAMPLE 2(b)

Acidulant blend pasta

Macaroni was pre-cooked for 4 minutes and drained. The macaroni was then packed in a 250 ml jar in a pack ratio of approximately 40/60 (macaroni/liquid). The product constituted 42.1% cooked macaroni elbows, 14.3% acidulant blend (1.07% titratable acidity as acetic acid), 0.25% salt and 43.35% water. The acidulant blend was glucono-delta-lactone/adipic/citric acid in a ratio of 80/10/10. The food product was processed in a still retort to an internal temperature of 195° F. for 15 minutes. Equilibrated final product pH was 4.30 and titratable acidity (as acetic) was 0.139. Organoleptic analysis disclosed virtually no acid flavour. A very natural pasta flavour was present and the product texture was good. The macaroni was semi-soft and maintained its shape integrity. The product integrity was much better than the product of Example 2(a).

EXAMPLE 2(c)

Acidulant blend pasta

Macaroni was pre-cooked for 4 minutes and drained. The macaroni was packed in a 250 ml jar in a pack ratio of approximately 40/60 (macaroni/liquid). The product compostion was 42.1% cooked macaroni elbows, 16.6% acidulant blend (1.07% titratable acidity as acetic acid), 0.3% salt and 41.0% water. The acidulant blend was glucono-delta-lactone/adipic/citric acid, 80/10/10. The food product was processed in the jar to an internal temperature of 175° F. for 15 minutes (through pasteurizer). Equilibrated final product pH was 3.96 and titratable acidity (as acetic acid) was 0.17%. Organoleptic analysis disclosed a very faint lingering acidic note. The flavour was mild. There was a very detectable pasta flavour. In regards to texture and macaroni elbow integrity, the product was very slightly soft and pleasantly edible. There were no objectionable cooked notes.

EXAMPLE 2(d)

Vinegar pack pasta

Macaroni was pre-cooked for 4 minutes and drained. The macaroni was packed in a 250 ml jar in a pack ratio of approximately 40/60 (macaroni/liquid). The product constituted 42.1% cooked macaroni elbows, 12.1% vinegar (4.1% titratable acidity as acetic acid), 0.6% salt and 45.2% water. The food product was processed in the jar to an internal temperature of 175° F. for 15 minutes (through pasteurizer). Equilibrated final product pH was 3.92 and titratable acidity (as acetic acid) was 0.66%. Organoleptic analysis disclosed a tart, vinegary flavour. The flavour was harsh and pasta flavours could not be noted. With respect to product texture and integrity, the product was very slightly soft and pleasantly edible. There were no objectionable cooked notes.

While several examples have been herein disclosed, it is obvious that various changes can be made without departing from the spirit and scope of the invention as set forth in the appended claims. Further, it is to be understood that all matter hereinbefore set forth is to be interpreted as illustrative and not in a limiting sense.

We claim:

1. A process for the preservation of food without imparting a substantial acidic taste wherein said food is one which normally exhibits a dramatic change in its flavour profile upon the addition of conventional acidulants said process comprising reducing the pH of the food to within the pH range of 2.5-6.9 by adding thereto a blend of three acidulants comprising glucono-delta-lactone, adipic acid and citric acid, said glucono-delta-lactone comprising at least 70% said adipic acid less than 30% and said citric acid less than 10% of said blend.

2. The process of claim 1 comprising the further step of subjecting the food to thermal processing conditions sufficient to eliminate undesired microbial growth said thermal processing conditions being milder than otherwise necessary has the pH of the food not been so reduced.

3. The process of claim 2 wherein the food is a low or non acid food.

4. The process of claim 2 wherein said food is hermetically sealed in a wet system in combination with said thermal processing.

5. The process of claim 2 wherein said food is comprised of fruits, vegetables of their juices.

6. The process of claims 2, 3, or 5 wherein the blend of acidulants comprises glucono-delta-lactone 80%, adipic acid 10% and citric acid 10%.

* * * * *